July 10, 1962 B. H. TONGUE 3,044,022

SYSTEM FOR WIDE-BAND NEUTRALIZATION

Filed Dec. 19, 1960 2 Sheets-Sheet 1

INVENTOR.
BEN H. TONGUE
BY Rines and Rines
ATTORNEYS

July 10, 1962 B. H. TONGUE 3,044,022

SYSTEM FOR WIDE-BAND NEUTRALIZATION

Filed Dec. 19, 1960 2 Sheets-Sheet 2

INVENTOR.
BEN H. TONGUE
BY Rines and Rines
ATTORNEYS

United States Patent Office 3,044,022

Patented July 10, 1962

3,044,022

SYSTEM FOR WIDE-BAND NEUTRALIZATION

Ben H. Tongue, West Orange, N.J., assignor to Blonder-Tongue Electronics, Newark, N.J., a corporation of New Jersey Filed Dec. 19, 1960, Ser. No. 76,680
9 Claims. (Cl. 330—78)

The present invention relates to neutralized amplifier systems, and, more particularly, to the wide-band neutralization of single-ended amplifier relay stages and the like.

Numerous types of neutralization circuits have been evolved throughout the years for damping a relay, such as an electron tube or a transistor amplifier or the like, in order to amplify a wide band of frequencies without the deleterious effects of spurious feed-back currents returned from the output to the input circuits of the relay as a result of inherent inter-electrode capacitances and the like. One such proposal is described, for example, in my prior Letters Patent No. 2,761,023, issued August 28, 1956, for Wide-Band Neutralized Radio-Frequency Amplifier.

Systems employing the invention disclosed in this Letters Patent, for example, have been found to work advisably well for neutralizing relatively broad bands of frequencies, such as, for example, either the 54 through 88 megacycle low-frequency VHF television band, or the 174 through 216 megacycle high-frequency VHF television band. If it is desired to effect this neutralization over both the low and high-frequency VHF bands, therefore, one would employ two separate amplifiers; one neutralized, in accordance with the teaching of the said Letters Patent, for the low television band, and the other, for the high television band.

There are occasions, however, where it is desirable to use a single amplifier to embrace a very much wider band, such as a very wide band that is to include both the low VHF television band and the high VHF television band. This requirement would involve wide-band neutralization for frequencies having a ratio of as much as four-to-one; whereas the said Letters Patent involves circuits for neutralizing frequencies of ratios up to about one and six tenths-to-one.

An object of the present invention, accordingly, is to provide a new and improved neutralizing system that can enable the achievement of this very much greater wide-band neutralization, and with the aid of but a single relay stage.

Another approach at neutralization is disclosed in my earlier United States Letters Patent No. 2,778,934, issued January 22, 1957, involving the utilization of an iron-core autotransformer coupled between the input and output of an electron-tube amplifier, for the purpose of neutralizing the feedback between the inter-electrode grid-plate capacitance, but again over a frequency-band ratio of up to about 1.16:1. While such a circuit may be employed, with known techniques, to extend the frequency ratio to somewhat larger ratios, this type of device is not inherently suited, as later explained, to cover bands of the great widths before discussed.

Another object of the invention is to provide a new and improved wide-band neutralization system that may employ in preferred form an autotransformer phase-reversing element in a compensatory output-to-input neutralizing circuit.

An additional object is to provide a novel neutralizing system of more general utility, also.

Other and further objects will be explained hereinafter and will be more particularly pointed out in connection with the appended claims.

The invention will now be described in connection with the accompanying drawing, FIG. 1 of which is a schematic circuit diagram illustrating the invention as applied to a single triode electron tube;

Figure 1:
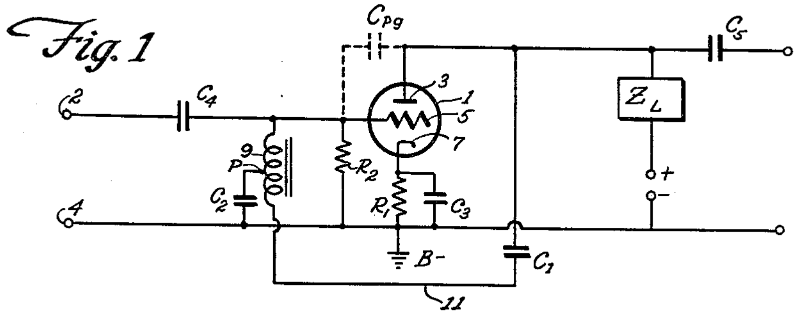

Referring to FIG. 1, an electron-tube relay amplifier is shown at 1, provided with an anode or plate electrode 3, a control electrode or grid 5, and a thermionic cathode 7. In the output circuit between the plate 3 and the cathode 7, there is connected a load, schematically represented at $Z_L$, and a source of plate or anode potential, indicated at the amplifier 1, for example, may be a radio-frequency amplifier, in which event, the output load $Z_L$ may assume the form of an output tuned circuit, as is well known in the art. The negative terminal of the plate supply is shown grounded at B—, and the cathode 7 is connected to the B— terminal through a by-pass capacitor $C_3$ and a cathode resistor $R_1$.

The term "ground" is used herein to connote not only actual earthing, but, also, other reference potential, such as chassis potential and the like. A grid-leak resistor $R_2$ is shown connected between the control electrode 5 and the terminal B—.

Applied to the input circuit, between the control electrode 5 and the cathode 7, is a source of, for example, radio-frequency signals, which may be applied to the terminals 2 and 4; the terminal 2 connecting through a coupling capacitor $C_4$ to the control electrode 5, and the terminal 4, connecting to the B— terminal. The stage 1 may be followed by subsequent stages, as is schematically represented by the output coupling capacitor $C_5$ at the upper terminal of the load $Z_L$.

As is explained in the said Letters Patent, an underdesired feedback current normally occurs through the relay 1 between the output circuit and the input circuit by virtue of the inter-electrode capacitance $C_{pg}$ shown dotted between the plate or anode 3, and the control electrode or grid 5. Compensatory network circuits of the said Letters Patent are, therefore, provided between the output and input to produce an out-of-phase compensatory current that mitigates against this undesirable fed-back current and thereby neutralizes the same so that the amplifier 1 may operate over a number of frequencies without interference with the gain of the amplifier.

The particular type of compensatory circuit employed herein, is shown comprising, preferably, an autotransformer 9 or other similar phase-reversing network or element, as later discussed. The upper terminal of the autotransformer 9 is connected in the input circuit to the control electrode 5, and the lower terminal is connected by conductor 11 and a series capacitance $C_1$ to the output circuit plate or anode 3. The performance of this type of compensating device, as explained in the said Letters Patent No. 2,778,934, involves the setting up of a current in the path 11 that is substantially equal and opposite to the feedback current passing from the output to the input through the interelectrode capacitance $C_{pg}$, whereby the net current between input and output circuits is substantially zero. The autotransformer 9 is preferably, though not essentially, an iron-core bifilar transformer.

Figure 4:
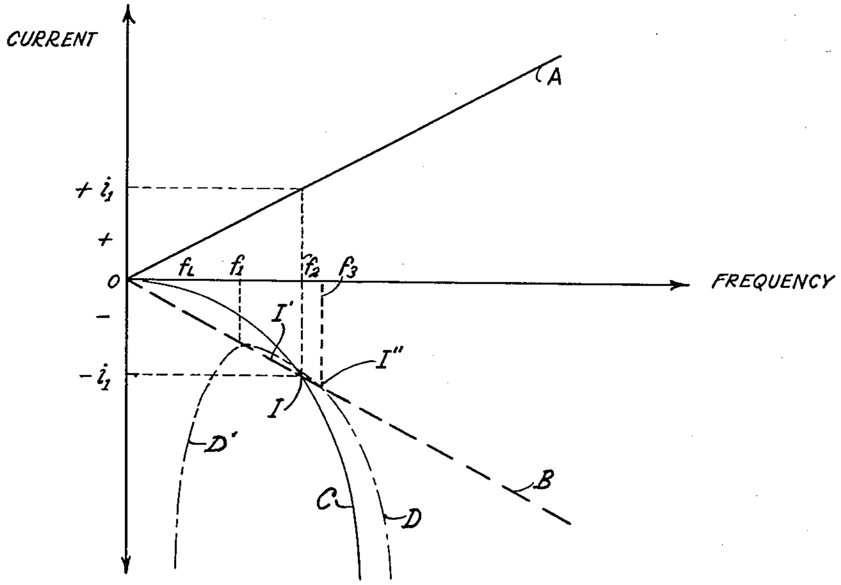
FIG. 4 is a graph illustrating the performance characteristics of the present invention, the ordinate plotting current and the abscissa frequency.

In this type of feedback system, as explained in the said Letters Patent 2,778,934, the current fed back along the feedback path $C_{pg}$, will increase with frequency, as shown by the substantially linear curve A of FIG. 4; indicating increased value of fed-back current of a positive nature, as a function of the frequency of the band of frequencies applied to the relay device 1. The neutralization process involves producing in the compensatory circuit 11, an oppositely-phased or negatively-going current, indicated by the dash-line curve B, which would, at each frequency, have a negative value of current corresponding in value to the positive value of the current in the curve A, thereby completely cancelling out all the feedback current over the frequency range. This method of operation has, however, inherently heretofore been adapted only for relatively limited frequency ranges over which adequate compensatory current can be produced, properly to neutralize the feedback current fed along the path $C_{pg}$. While those limited frequency ranges seemed relatively wide, as referred to the state of the art at the time the inventions of the said Letters Patent were made, they are narrow compared with the bands available in accordance with the present invention.

Referring to FIG. 4, therefore, curve C represents the type of compensatory current produced in the feedback path 11, comprising the members 9 and $C_1$, described in the said Letters Patent. The values represented by curve C, however, except for what may now be called a "narrow" region I (near frequency $f_2$), closely correspond to curve B and thus do not provide for near-perfect compensation for the actual feed back current at the lower frequencies $f_L$ or the higher frequencies above $f_2$, the slope of the curve C rapidly increasing in a negative sense because of the leakage inductance of transformer 9 approaching series resonance with $C_1$. The correct value at I is obtained by using a smaller value of $C_1$ than would produce the initial response of curve B. It is only at the frequency $f_2$, or the region slightly above and below the same, that the actual curve C intersects the curve B, as represented by the region I, indicating the correct value $-i_1$ of compensatory current in the feedback circuit 11, substantially equal and opposite to the interelectrode-capacitance-path feedback current $+i_1$. Neutralization is thus achieved at this "narrow" region I, as taught in the said Letters Patent.

It has now been discovered, however, that, through the utilization of an appropriate critical value of capacitance from an intermediate point of the phase-reversing network 9, to a terminal common to both the input and output circuits of the relay 1, and appropriate adjustment of the value of that capacitance together with the series capacitance $C_1$ in the feedback path 11, entirely new results can be obtained that, for the first time, enable this type of compensatory network, involving the members 9 and $C_1$, to be useful over a very wide band of frequencies, far in excess of the bands involved in Letters Patent Nos. 2,778,934 and 2,761,023. In fact, for the first time, a single stage may be readily used, without the deleterious effects of degenerative resistive loading, as in the "neutrode" capacitance bridge neutralization, and neutralized over the complete low- and high-television VHF bands, taken together, including the intermediate FM band, as well; which has not heretofore been commercially possible with the aid of a single stage.

It remains to explain the details of this discovery that converts an inherently relatively narrow-band frequency neutralizing system (which was previously thought of as "wide-band") into this amazing truly wide-band system. If a very critically valued capacitance $C_2$ is connected from an intermediate point, shown preferably as the mid-point P of the autotransformer 9 of FIG. 1, to the common terminal B— of the input and output circuits, a response takes place that is vitally different from curve C of FIG. 4. At the lower frequencies $f_L$, the current in the network circuit 11 of FIG. 1 no longer increases with increasing frequency, as in curve C, but it decreases with increasing frequency over a predetermined region, as shown at the left-hand side D' of dash-dot curve D, FIG. 4. This results in a first low-frequency coincidence with the theoretically desirable curve B at frequency $f_1$, and then a subsequent coincidence with the curve B at a high frequency $f_3$, providing a very broad intermediate region I', I'', extending over the very broad frequency range $f_1$ to $f_3$, for close approximation to the theoretical curve B.

While in VHF television systems, autotransformers, such as shown at 9, have certainly been by-passed to ground, with capacitors that, at first blush, would appear to correspond to the capacitance $C_2$, these prior-art by-pass capacitors have been of the order of 1000 micro-microfarads, more or less, and have only been employed in regions where a bias must be introduced, as described in the said Letters Patent 2,778,934. In accordance with the present invention, on the other hand, a very critical and highly different order of magnitude of value of $C_2$, of the order of 80 micro-microfarads, somewhat more or less, in the case of VHF television bands, is employed to perform the very different function of converting the curve C into the curve D by establishing a deliberate series resonance between the portion of the autotransformer 9 disposed between the control electrode 5 and the center or intermediate point P, and the capacitance $C_2$, at a low frequency $f_L$, outside the broad frequency range $f_1$ to $f_3$ of interest.

It is usually required, in actual practice, moreover, that the value of the capacitor $C_2$ and that of the series compensating feedback capacitor $C_1$ of the path 11 be further adjusted so that the value of the compensatory current near the center of the broadened region I'—I'' (or, substantially intermediate the region from $f_1$ to $f_3$) will correspond substantially to the corresponding feedback current $+i_1$ produced within the same region $f_1$—to—$f_3$, as illustrated in curve A.

By this technique, accordingly, the previously relatively "narrow"-band type of compensatory neutralizing circuit comprising the autotransformer or similar device 9 and the series capacitor $C_1$ has been startingly converted from a neutralizing system operable only in the vicinity of a single region I, to a very wide-band neutralizing system operable over a low and high region I'—I'', which, in actual practice, in the case of the said VHF television bands, has been found capable of extending over a 4:1 frequency range—all with a single amplifying tube 1.

From another point of view, this deliberate resonating of the upper portion of the autotransformer 9 above the center tap P with the capacitor $C_2$ at a frequency below the desired operating range, has the effect, at that low range, of moving the tap P upward, so that the turns ratio of the transformer 9 is effectively altered. A very broad range I'—I'' is produced with the peaked curve D, as contrasted with prior-art ranges in the vicinity of I, as taught in the said prior Letters Patent No. 2,778,934.

Figure 2:
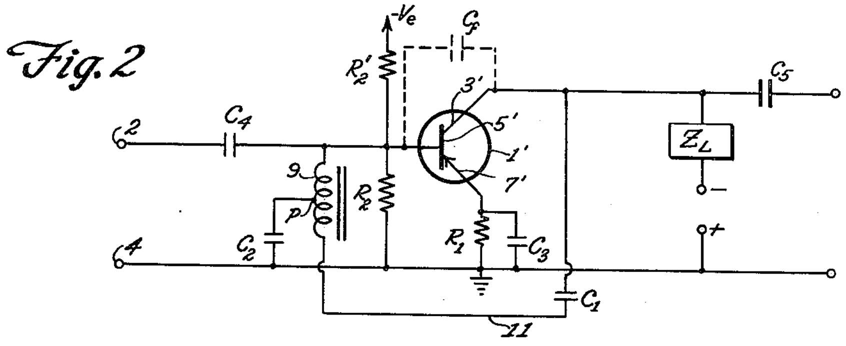
FIG. 2 is also a similar circuit diagram, but illustrating the invention as applied to a transistor relay.

A transistor relay 1', analogous to the electron-tube amplifier 1, except that it is provided with a much lower input resistance and is a current-operated device, is shown in FIG. 2 provided with a similar compensating circuit, the corresponding similar parts having similar reference numerals, and the transistor 1′ being shown provided with a base 5′, an emitter 7′ and a collector 3′, and having inherent feedback capacitance through the relay 1′, indicated at $C_f$.

Figure 3:
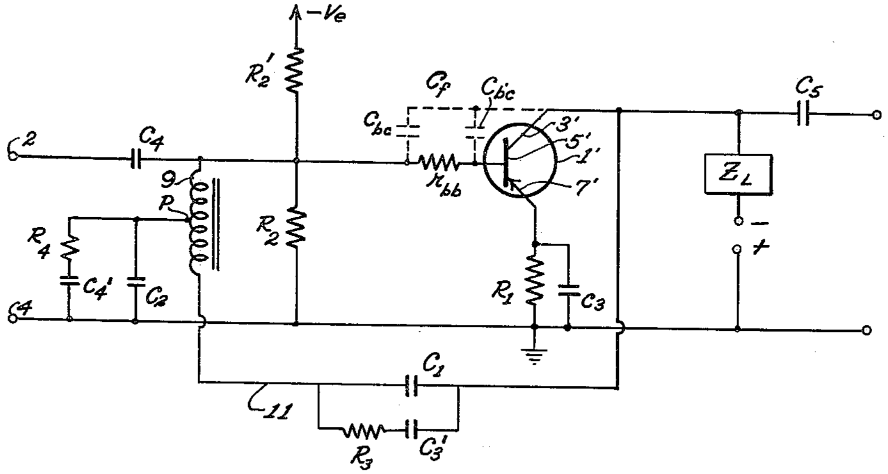
FIG. 3 is a circuit diagram similar to FIG. 2 of a modified transistor version.

In actual practice, in the system of FIG. 2, there is, in addition to the inherent feedback capacitance $C_f$, a resistance-containing feedback path. This is indicated in FIG. 3 by the resistance $r_{bb}$, in series with the base 5′, and resulting from the so-called spreading resistance of the base. There is thus involved in the feedback capacitance $C_f$ a combination of a capacitance $C_{b'c}$ between the collector 3′ and an intrinsic internal base 5′, and a capacitance $C_{bc}$, between the collector 3′ and the actual external connection to the base shown as the left-hand terminal of the spreading resistor $r_{bb}$, the latter being the extrinsic feedback capacitance. In the systems of FIGS. 2 and 3, the appropriate bias for the base is shown obtained by the divider network $R_2$—$R_2'$ from the negative source —*ve*. The load $Z_L$ is shown connected to the negative terminal of the source —, +, the positive terminal + of which is shown connected to ground.

In the system of FIG. 3, in order to compensate for this additional resistance-containing feedback path, the capacitor $C_2$ is shown shunted by a combination of resistance $R_4$ and capacitance $C_4'$. The fed-back energy may not be exactly 180 degrees out of phase with respect to the energy fed back from the path $C_f$, so that the additional compensatory resistance-capacitance network $R_4$, $C_4'$ may provide for the required correction. There is also not exactly a 90-degree feedback current resulting in the resistance containing path $C_{b'c}$—$r_{bb}$, so that the circuit 11 is provided, in shunt with the capacitance $C_1$, with a network $R_3$, $C_3'$, such that the compensatory factor of $R_3$, $C_3$ keeps the current fed back by the circuit 11 substantially 180-degrees with respect to the feedback through the feedback capacitance $C_f$.

Figure 5:
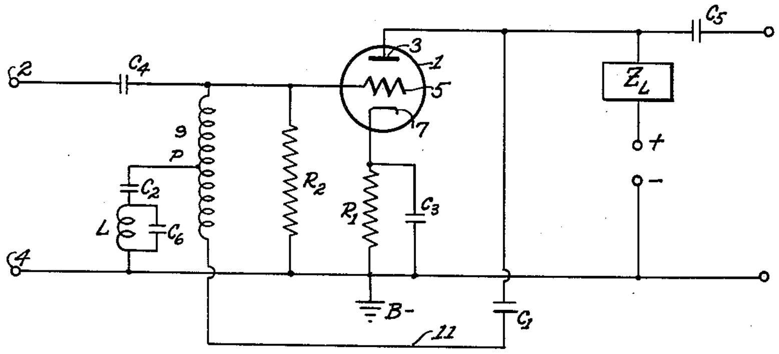
FIG. 5 is a similar circuit diagram of a modified electron-tube circuit.

Attention is further invited to the fact that, inherent in the leads associated with the rather critically valued capacitance $C_2$, is a certain amount of inductance. This beneficially serves the purpose of slowing the rate of negative current rise of the right-hand portion of curve D, thereby tending further to widen the range I′, I″. This effect may be magnified by adding actual physical inductance L to the capacitor $C_2$, as shown in FIG. 5. It must be insured, however, that the added inductance L, while appreciable with respect to the mutual inductance of the autotransformer 9, be not actually comparable or greater than the same. Otherwise stated, the inductance L must not be negligible compared to the mutual inductance of the autotransformer 9; but, on the other hand, it must not be comparable to the same, as otherwise the output of the autotransformer 9 will drop too far at the higher end of the band. The inductance L may be shunted by a capacitance $C_6$, FIG. 5, with the combination L—$C_6$ being operated below its resonance in the region where it appears as an effective inductance, and the overall combination $C_2$, L, $C_6$ is capacitive.

Further modifications will also occur to those skilled in the art, and all such are considered to fall within the spirit and scope of the invention, as defined in the appended claims.

What is claimed is:

1. In a wide frequency band amplifier system having relay means provided with input and output circuits sharing a common terminal and in which a feedback current is produced through the relay between the input and output circuits that is to be neutralized by an oppositely phased compensatory current in a neutralizing circuit connected external to the common terminal between the input and output circuits, the neutralizing circuit comprising a phase-reversing impedance element connected in series with first capacitance, whereby the compensatory current is of increasing value as a function of increasing frequency insufficient to neutralize the said feedback current at the lower frequencies of the band, but sufficient for substantial neutralization at a single narrow region intermediate the band; the improvement of second capacitance connected between an intermediate point of the said impedance element and the common terminal, the second capacitance having a value sufficient to provide a decreasing compensatory current as a function of increasing frequency at the said lower frequencies of value in excess of that required for neutralization in order substantially to widen the said narrow region into a broad region intermediate the band over which sufficient compensatory current for substantial neutralization is achieved, the said first and second capacitance being adjusted to make the value of the compensatory current over the said broad region coincide substantially with the value of the feedback current over the said widened region.

2. A system as claimed in claim 1 and in which the said impedance element comprises an autotransformer.

3. A system as claimed in claim 2 and in which the said second capacitance is connected with inductance of value substantially less than the mutual inductance of the said autotransformer.

4. A system as claimed in claim 3 and in which the said inductance is resonated at a frequency outside the said widened region.

5. A system as claimed in claim 1 and in which at least one of the said first and second capacitances is shunted by a resistance-capacitance network.

6. A system as claimed in claim 1 and in which the said second capacitance is resonated at a frequency outside the said band with the portion of the said impedance element between its said intermediate point and a terminal of the said input circuit other than the said common terminal.

7. A system as claimed in claim 6 and in which the said resonated frequency lies below the said band.

8. In a wide frequency band amplifier system having electron-tube relay means provided with input and output circuits sharing a common terminal and in which a feedback current is produced through the electron-tube relay between the input and output circuits that is to be neutralized by an oppositely phased compensatory current in a neutralizing circuit connected external to the common terminal between the input and output circuits, the neutralizing circuit comprising a phase-reversing impedance element connected in series with first capacitance, whereby the compensatory current is of increasing value as a function of increasing frequency insufficient to neutralize the said feedback current at the lower frequencies of the band, but sufficient for substantial neutralization at a single narrow region intermediate the band; the improvement of second capacitance connected between an intermediate point of the said impedance element and the common terminal, the second capacitance having a value sufficient to provide a decreasing compensatory current as a function of increasing frequency at the said lower frequencies of value in excess of that required for neutralization in order substantially to widen the said narrow region into a broad region intermediate the band over which sufficient compensatory current for substantial neutralization is achieved, the said first and second capacitance being adjusted to make the value of the compensatory current over the said broad region coincide substantially with the value of the feedback current over the said widened region.

9. In a wide frequency band amplifier system having transistor relay means provided with input and output circuits sharing a common terminal and in which a feedback current is produced through the transistor relay between the input and output circuits that is to be neutralized by an oppositely phased compensatory current in a neutralizing circuit connected external to the common terminal between the input and output circuits, the neutralizing circuit comprising a phase-reversing impedance element connected in series with first capacitance, whereby the compensatory current is of increasing value as a function of increasing frequency insufficient to neutralize the said feedback current at the lower frequencies of the band, but sufficient for substantial neutralization at a single narrow region intermediate the band; the improvement of second capacitance connected between an intermediate point of the said impedance element and the common terminal, the second capacitance having a value sufficient to provide a decreasing compensatory current as a function of increasing frequency at the said lower frequencies of value in excess of that required for neutralization in order substantially to widen the said narrow region into a broad region intermediate the band over which sufficient compensatory current for substantial neutralization is achieved, the said first and second capacitance being adjusted to make the value of the compensatory current over the said broad region coincide substantially with the value of the feedback current over the said widened region.

No references cited.